(12) United States Patent
Imai et al.

(10) Patent No.: US 11,114,098 B2
(45) Date of Patent: Sep. 7, 2021

(54) CONTROL OF INTERACTION BETWEEN AN APPARATUS AND A USER BASED ON USER'S STATE OF REACTION

(71) Applicant: FUJITSU LIMITED, Kawasaki (JP)

(72) Inventors: Takashi Imai, Atsugi (JP); Kei Taira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 16/666,949

(22) Filed: Oct. 29, 2019

(65) Prior Publication Data

US 2020/0184969 A1     Jun. 11, 2020

(30) Foreign Application Priority Data

Dec. 5, 2018 (JP) .............................. JP2018-228410

(51) Int. Cl.
| | |
|---|---|
| G10L 15/00 | (2013.01) |
| G10L 15/22 | (2006.01) |
| G10L 17/22 | (2013.01) |
| G10L 15/26 | (2006.01) |

(52) U.S. Cl.
CPC .............. *G10L 15/22* (2013.01); *G10L 15/26* (2013.01); *G10L 17/22* (2013.01); *G10L 2015/225* (2013.01); *G10L 2015/227* (2013.01); *G10L 2015/228* (2013.01)

(58) Field of Classification Search
CPC ..... G10L 15/22; G06F 16/338; G06F 16/9535
See application file for complete search history.

(56) References Cited

U.S. PATENT DOCUMENTS

| | | | | |
|---|---|---|---|---|
| 5,261,087 | A * | 11/1993 | Mukaino | ........... G06F 16/90344 |
| 5,918,222 | A * | 6/1999 | Fukui | ..................... G06Q 10/10 |
| 8,185,380 | B2 * | 5/2012 | Kameyama | .......... G08G 1/0962 |
| | | | | 704/10 |
| 2001/0021909 | A1 * | 9/2001 | Shimomura | ............ G10L 15/22 |
| | | | | 704/275 |
| 2016/0219119 | A1 * | 7/2016 | Yu | ......................... H04L 67/306 |
| 2017/0126825 | A1 * | 5/2017 | Yu | ........................... H04L 67/10 |

FOREIGN PATENT DOCUMENTS

| | | |
|---|---|---|
| JP | 2002-108388 | 4/2002 |
| JP | 2002-342065 | 11/2002 |

* cited by examiner

*Primary Examiner* — Daniel Abebe
(74) *Attorney, Agent, or Firm* — Staas & Halsey LLP

(57) ABSTRACT

An apparatus estimates, based on an input from a user to an interaction performed during a conversation between the user and the apparatus, an interest degree indicating a degree of interest of the user in a first topic included in the interaction, and estimates, based on the input from the user to the interaction, acceptability of the interaction by the user. The apparatus selects, in accordance with the interest degree and the acceptability, as an operation mode for performing the interaction, one of a first mode of leaving an interaction initiative to the user and a second mode in which the interaction proceeds under an initiative of a system for a specific topic. The apparatus generates interaction data according to the selected operation mode, and causes an output device to output the generated interaction data.

17 Claims, 9 Drawing Sheets

CONTROL OF INTERACTION BETWEEN AN APPARATUS AND A USER BASED ON USER'S STATE OF REACTION

CROSS-REFERENCE TO RELATED APPLICATION

This application is based upon and claims the benefit of priority of the prior Japanese Patent Application No. 2018-228410, filed on Dec. 5, 2018, the entire contents of which are incorporated herein by reference.

FIELD

The embodiments discussed herein are related to control of interaction between an apparatus and an user based on user's state of reaction.

BACKGROUND

Voice guidance generating devices that provide voice guidance for executing commands of applications such as transmission of electronic mail have been disclosed. Such a voice guidance generating device determines an interaction form with the user according to the type of guidance specified in advance, such as a user initiative type or a system initiative type.

An interaction device is disclosed in which, based on the magnitude of a motion of each part of the body of the user when the voice input of the user changes from presence to absence, it is determined whether the user is going to continue to utter a word or the user is going to transfer the right of utterance to a system.

Related techniques are disclosed in, for example, Japanese Laid-open Patent Publication No. 2002-342065 and Japanese Laid-open Patent Publication No. 2002-108388.

SUMMARY

According to an aspect of the embodiments, an apparatus estimates, based on an input from a user to an interaction performed during a conversation between the user and the apparatus, an interest degree indicating a degree of interest of the user in a first topic included in the interaction, and estimates, based on the input from the user to the interaction, acceptability of the interaction by the user. The apparatus selects, in accordance with the interest degree and the acceptability, as an operation mode for performing the interaction, one of a first mode of leaving an interaction initiative to the user and a second mode in which the interaction proceeds under an initiative of a system for a specific topic. The apparatus generates interaction data according to the selected operation mode, and causes an output device to output the generated interaction data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The voice guidance generating device described above provides guidance for performing processes determined in advance, such as executing commands of applications, and there have been some cases where a continuous interaction may not be performed without boring the user. The interaction device described above is intended to determine which of the user and the system has the right of utterance, and there have been some cases where a continuous interaction may not be performed without boring the user.

It is desirable that interactions between people and computers continue without boring the user.

Hereinafter, examples of embodiments of the disclosed techniques will be described in detail with reference to the accompanying drawings. Examples of forms in which the disclosed techniques are applied to an interaction control system for a conversation between a user and a computer will be described.

First Embodiment

Figure 1:
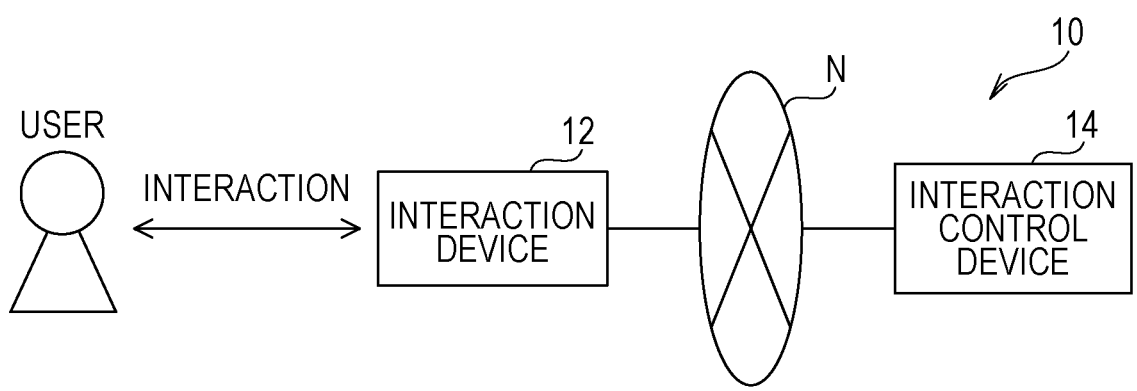
FIG. 1 is a block diagram illustrating a schematic configuration of an interaction control system according to each embodiment.

With reference to FIG. 1, the configuration of an interaction control system 10 according to the present embodiment will be described. As illustrated in FIG. 1, the interaction control system 10 includes an interaction device 12 and an interaction control device 14. The interaction device 12 and the interaction control device 14 are each coupled to a network N.

The interaction device 12 is installed in the home of a user, a facility visited by the user, or the like and interacts with the user by voice under control of the interaction control device 14. Examples of the interaction device 12 include an artificial Intelligence (AI) speaker and a communication robot.

The interaction control device 14 is installed in a data center or the like and controls an interaction with a user by using the interaction device 12. Examples of the interaction control device 14 include a server computer and a cloud server.

The interaction control system 10, in which an interaction with a user is performed, is able to collect more amounts of information from the user by causing interactions with the user to continue. The interaction control system 10 is able to provide information more appropriate for the user by collecting more amounts of information from the user. This leads to more frequent usage of the interaction control system 10 by the user, which enables the interaction control system 10 to collect still more amounts of information from the user. As a result, information more appropriate for the user may be provided.

Accordingly, to cause interactions with the user to continue, the interaction control system 10 according to the present embodiment has two operation modes, which are a listening mode of leaving the initiative of an interaction to the user and a specific topic mode in which an interaction on a specific topic proceeds under the initiative of the system. The interaction control system 10 selects which of the listening mode and the specific topic mode, as an operation mode for performing an interaction, in accordance with the probability of the interest (hereinafter referred simply as the probability) that the user is interested in a topic included in an interaction and the acceptability of the interaction by the user (hereinafter referred simply as the acceptability). The listening mode corresponds to a first mode of the disclosed techniques and the specific topic mode corresponds to a second mode of the disclosed techniques. The probability that a user is interested in a topic, as used herein, corresponds to the degree of interest of the user in the topic.

Figure 2:
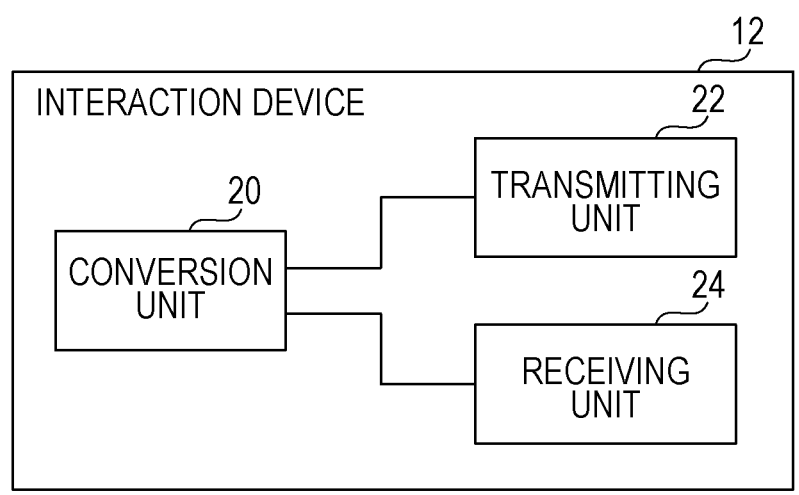
FIG. 2 is a functional block diagram of an interaction device according to each embodiment.

With reference to FIG. 2, the functional configuration of the interaction device 12 according to the present embodiment will be described. As illustrated in FIG. 2, the interaction device 12 includes a conversion unit 20, a transmitting unit 22, and a receiving unit 24.

The conversion unit 20 receives utterances of a user via a voice input device 66 described later and converts voice data representing the received utterances to text data. The utterances of the user input via the voice input device 66 are an example of input from the user to an interaction in the disclosed techniques. The conversion unit 20 converts text data representing utterances received by the receiving unit 24 described later to voice data. The conversion unit 20 makes response utterances by causing synthesized voice data, which represents the response utterances, to be output from a voice output device 67 described later. The response utterances output from the voice output device 67 by the interaction device 12 are an example of an interaction output of the disclosed techniques. Examples of the interaction output include synthesized voice output.

The transmitting unit 22 transmits text data representing utterances of the user obtained through conversion by the conversion unit 20 to the interaction control device 14. The receiving unit 24 receives text data representing utterances transmitted from the interaction control device 14.

Figure 3:
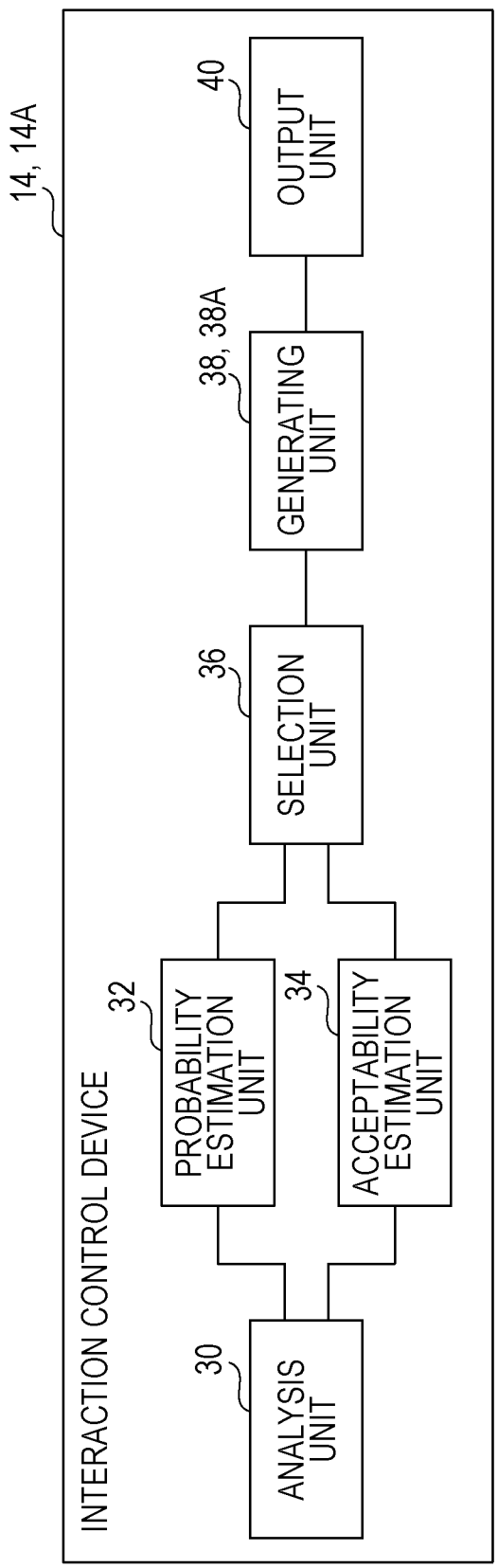
FIG. 3 is a functional block diagram of an interaction control device according to each embodiment.

With reference to FIG. 3, the functional configuration of the interaction control device 14 according to the present embodiment will be described. As illustrated in FIG. 3, the interaction control device 14 includes an analysis unit 30, a probability estimation unit 32, an acceptability estimation unit 34, a selection unit 36, a generating unit 38, and an output unit 40.

The analysis unit 30 receives text data representing utterances of the user transmitted from the interaction device 12. The analysis unit 30 performs known natural language processing on the received text data, thereby performing morphological analysis, determining the meaning of a sentence, such as a question sentence or a sentence in an affirmative form, a negative form, or another form, and performing analysis such as estimation of emotion of the user.

The probability estimation unit 32 estimates, from the utterances of the user, a topic in which the user is interested, and estimates the probability that the user is interested in the estimated topic. Examples of the topic include politics, the economy, education, sports, and entertainment. The classifications of topics are not limited to this example and, for example, sports may be finely classified into baseball, soccer, and so on. The probability according to the present embodiment represents the likelihood that the user is interested in a topic, and the greater the likelihood, the greater value the probability has.

For example, the probability estimation unit 32 estimates a topic in which the user is interested, for example, from the frequency of occurrences of a term regarding the topic in utterances of the user. The probability estimation unit 32 normalizes the probability to a value greater than or equal to 0 and less than or equal to 1, and estimates the probability by increasing and decreasing the probability as indicated below in (A) to (D). In the present embodiment, for example, topic options such as politics, the economy, education, sports, and entertainment are predetermined and, for each option, the probability estimation unit 32 increases and decreases the probability from utterances of the user as indicated below in (A) to (D).

(A) When the user utters a term related to a topic, the probability estimation unit 32 increases the probability of the topic.

(B) When the response of the user to utterances regarding a topic of the interaction device 12 is affirmative, the probability estimation unit 32 increases the probability of the topic.

(C) When the response of the user to a question about a topic uttered by the interaction device 12 is a response within the assumed range, the probability estimation unit 32 increases the probability of the topic.

(D) With lapse of time, the probability estimation unit 32 decreases the probability of the topic.

The form is illustrated in which the value (for example, 0.1) by which the probability is increased or decreased in (A) to (D) is predetermined through an experiment or the like.

The acceptability estimation unit 34 estimates the acceptability of an interaction by the user from the meaning of a sentence, such as an affirmative or negative meaning, in the utterances of the user, a response to the utterances made by the interaction device 12, the utterance time, the emotion of the user, and so on. The acceptability according to the present embodiment represents the degree to which the user accepts an interaction with the interaction control system 10, and the higher the degree, the greater the value. The acceptability also represents the degree to which the user is satisfied with an interaction with the interaction control system 10.

The acceptability estimation unit 34 normalizes the acceptability to a value greater than or equal to 0 and less than or equal to 1, and estimates the acceptability by increasing and decreasing the acceptability as indicated below in (E) to (K).

(E) The acceptability estimation unit 34 decreases the acceptability when the meaning of a sentence of utterances from the user is negative.

(F) The acceptability estimation unit 34 decreases the acceptability when, despite the lapse of a predetermined time period or more since utterances were made by the interaction device 12, there is no response from the user.

(G) The acceptability estimation unit 34 increases the acceptability when the number of times the user utters a word in the immediately previous predetermined period is larger than a predetermined number.

(H) The acceptability estimation unit 34 increases the acceptability when the number of backchannel responses to utterances from the interaction device 12 is larger than a predetermined number.

(I) The acceptability estimation unit 34 increases the acceptability when the user responds to a topic in utterances of the interaction device 12 with the same or similar topic.

(J) The acceptability estimation unit 34 increases the acceptability when the utterance time spent in one uttering of the user is longer than or equal to a predetermined time.

(K) The acceptability estimation unit 34 increases the acceptability when the emotion of a user estimated from utterances of the user is an affirmative emotion, and decreases the acceptability when the estimated emotion is a negative emotion.

The form is illustrated in which the value (for example, 0.1) by which the acceptability is increased or decreased in (E) to (K) is predetermined through an experiment or the like. The text data, probability, and acceptability representing utterances of the user are stored as histories in a given storage area of the interaction control device 14.

The acceptability estimation unit 34 may use an intonation of the voice of the user for estimation of the acceptability. In the case where the interaction control system 10 includes an imaging device to capture an expression of the user, the acceptability estimation unit 34 may use the expression of the user included in an image captured by the imaging device for estimation of the acceptability.

The selection unit 36 selects which of the listening mode and the specific topic mode, as an operation mode for performing an interaction, in accordance with the probability estimated by the probability estimation unit 32 and the acceptability estimated by the acceptability estimation unit 34.

For example, the selection unit 36 selects the listening mode as the operation mode when the current operation mode is the listening mode and when there is no topic the probability of which is greater than or equal to a certain value. Accordingly, in this case, the listening mode continues.

The selection unit 36 selects the listening mode as the operation mode when the current operation mode is the listening mode, when there is a topic the probability of which is greater than or equal to the certain value, and when the acceptability is greater than or equal to a threshold TH1 and the reduction in acceptability is less than a threshold TH2. Accordingly, in this case, the listening mode continues. The threshold TH1 is an example of a first threshold in the case where the current operation mode in the disclosed techniques is a first mode, and the threshold TH2 is an example of a second threshold in the case where the current operation mode in the disclosed techniques is the first mode.

When the current operation mode is the listening mode, when there is a topic the probability of which is greater than or equal to the certain value, and when the acceptability is less than or equal to the threshold TH1 or the reduction in acceptability is greater than or equal to the threshold TH2, the selection unit 36 selects the specific topic mode as the operation mode. In this case, the selection unit 36 selects a topic the probability of which is greater than or equal to the certain value, as a topic for which the interaction proceeds in the specific topic mode. Accordingly, in this case, the operation mode is switched from the listening mode to the specific topic mode in which an interaction proceeds for a topic the probability of which is greater than or equal to the certain value. In the case where there are a plurality of topics the probability of each of which is greater than or equal to the certain value, the selection unit 36 may randomly select one topic among the plurality of topics the probability of each of which is greater than or equal to the certain value or, in order to perform an interaction for a new topic, the selection unit 36 may select a topic for which an interaction has not occurred within the immediately previous predetermined period. In such a case, the selection unit 36 may select a topic the probability of which is highest among the plurality of topics the probability of each of which is greater than or equal to the certain value. In this case, a topic to be selected may be the same as or may be different from the topic that is dealt with by the probability used for calculations of the thresholds TH1 and TH2 described later.

The reduction in acceptability according to the present embodiment represents the amount of reduction in acceptability per unit time, and the higher the degree to which the acceptability is reduced, the larger the reduction in acceptability.

With regard to the threshold TH1 according to the present embodiment, the higher the probability, the larger the threshold TH1. Thereby, in the case where the current operation mode is the listening mode, the higher the probability of a topic, the more easily the operation mode is switched to the specific topic mode even when the acceptability is high. For example, the threshold TH1 is calculated, for example, by the following equation (1). In equation (1), c represents the probability, TH1max represents the maximum value (for example, 0.8) of the threshold TH1, and TH1 min represents the minimum value (for example, 0.2) of the threshold TH1.

$$TH1 = c \times TH1\max + (1-c) \times TH1\min \quad (1)$$

The threshold TH1 may be calculated, for example, by the following equation (2). In equation (2), α and β represent constants (for example, α=0.3 and β=0.7) that satisfy 0<α<β<1. The threshold TH1 calculated by equation (2) is TH1 min when c (probability)<α and is TH1max when c>β. When α≤c≤β, the threshold TH1 satisfies TH1min≤TH1≤TH1max, where the larger the probability c, the larger the threshold TH1.

$$\left. \begin{array}{l} TH1 = TH1 \min \text{ (when } c < \alpha) \\ TH1 = \dfrac{c-\alpha}{\beta-\alpha} \times TH1 \max + \dfrac{\beta-c}{\beta-\alpha} \times TH1 \min \text{ (when } \alpha \leq c \leq \beta) \\ TH1 = TH1 \max \text{ (when } c > \beta) \end{array} \right\} \quad (2)$$

With regard to the threshold TH2 according to the present embodiment, the higher the probability, the smaller the threshold TH2. Thereby, in the case where the current operation mode is the listening mode, the higher the probability of a topic, the more easily the operation mode is switched to the specific topic mode even when the reduction in acceptability is small. For example, the threshold TH2 is calculated, for example, by the following equation (3). In equation (3), TH2max represents the maximum value (for example, 0.3) of the threshold TH2, and TH2 min represents the minim value (for example, 0.1) of the threshold TH2.

$$TH2 = (1-c) \times TH2\max + c \times TH2\min \quad (3)$$

The threshold TH2 may be calculated, for example, by the following equation (4). The threshold TH2 calculated by equation (4) is TH2max when c (probability)<α, and is TH2 min when c>β. When α≤c≤β, the threshold TH2 satisfies TH2min≤TH2≤TH2max, where the larger the probability c, the smaller the threshold TH2. With regard to the probability in calculating the thresholds TH1 and TH2, when there are a plurality of topics, the form is illustrated in which, among probabilities respectively dealing with the plurality of topics, the largest probability is used.

$$\left.\begin{array}{l}TH2 = TH2 \max \text{ (when } c < \alpha) \\ TH2 = \frac{\beta - c}{\beta - \alpha} \times TH2 \max + \frac{c - \alpha}{\beta - \alpha} \times TH2 \min \text{ (when } \alpha \le c \le \beta) \\ TH2 = TH2 \min \text{ (when } c > \beta)\end{array}\right\} \quad (4)$$

Figure 4:
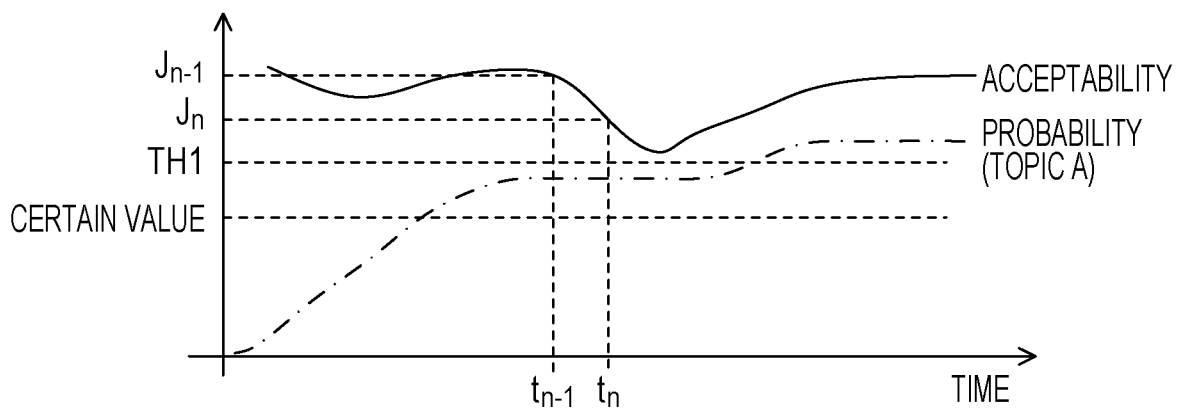
FIG. 4 is a graph illustrating an example of time-sequential changes in probability and acceptability.

With reference to FIG. 4, a specific example of a process of selecting an operation mode performed by the selection unit 36 when the current operation mode is the listening mode will be described. The solid line in FIG. 4 represents the acceptability, and a dash-dot line represents the probability of topic A. In FIG. 4, $t_n$ represents the current time at which the probability and the acceptability are estimated by using the most recently input utterances, and $t_{n-1}$ represents a time at which the probability and the acceptability are estimated by using utterances input at a time previous to the time $t_n$. The case where the operation mode selected at the time $t_{n-1}$ by the selection unit 36, that is, the current operation mode is the listening mode will now be described.

As illustrated in FIG. 4, there is a topic the probability of which is greater than or equal to the certain value at the time $t_n$ (topic A in the example in FIG. 4). At the time $t_n$, the acceptability is greater than or equal to the threshold TH1. The reduction R in the acceptability at the time $t_n$, which is calculated by equation (5) below, is assumed to be greater than or equal to the threshold TH2. Accordingly, the selection unit 36 selects the specific topic mode as the operation mode and selects topic A as a topic for which an interaction proceeds in the specific topic mode. In equation (5), $J_{n-1}$ represents the acceptability at the time $t_{n-1}$, and $J_n$ represents the acceptability at the time $t_n$.

$$R = (J_{n-1} - J_n)/(t_n - t_{n-1}) \quad (5)$$

The selection unit 36 may set, as the reduction in acceptability, the absolute value of the slope of a tangent at the time $t_n$ of a curve, which is obtained by approximating time-sequential changes in the acceptability by a polynomial or the like, when the slope has a negative value.

When the current operation mode is the specific topic mode, when there is not another topic the probability of which is greater than or equal to the certain value, and when the acceptability is less than the threshold TH3, the selection unit 36 selects the listening mode as the operation mode. Accordingly, in this case, the operation mode is switched from the specific topic mode to the listening mode. Another topic as used herein means a topic other than the current topic for which an interaction proceeds in the specific topic mode until just before the operation mode is switched.

When the current operation mode is the specific topic mode, when there is not another topic the probability of which is greater than or equal to the certain value, and when the acceptability is greater than or equal to the threshold TH3, the selection unit 36 selects the specific topic mode as the operation mode. In this case, the selection unit 36 selects the current topic as a topic for which the interaction proceeds in the specific topic mode. Accordingly, in this case, the specific topic mode in which an interaction proceeds for the current topic continues.

When the current operation mode is the specific topic mode, when there is another topic the probability of which is greater than or equal to the certain value, and when the acceptability is less than the threshold TH3 or the reduction in acceptability is greater than or equal to the threshold TH4, the selection unit 36 selects the specific topic mode as the operation mode. The selection unit 36 selects another topic the probability of which is greater than or equal to the certain value, as a topic for which an interaction proceeds in the specific topic mode. Accordingly, in this case, while the operation mode remains in the specific topic mode, the topic is switched. When there are a plurality of topics the probability of each of which is greater than or equal to the certain value, the selection unit 36 may select one topic as in the case where the operation mode is switched from the listening mode to the specific topic mode as described above. The threshold TH3 is an example of the first threshold in the case where the current operation mode in the disclosed techniques is the second mode, and the threshold TH4 is an example of the second threshold in the case where the current operation mode in the disclosed techniques is the second mode.

When the current operation mode is the specific topic mode, when there is another topic the probability of which is greater than or equal to the certain value, and when the acceptability is greater than or equal to the threshold TH3 and the reduction in acceptability is less than the threshold TH4, the selection unit 36 selects the specific topic mode as the operation mode. The selection unit 36 selects the current topic as a topic for which an interaction proceeds in the specific topic mode. Accordingly, in this case, the specific topic mode in which an interaction proceeds for the current topic continues.

With regard to the threshold TH3 according to the present embodiment, the higher the probability of the current topic, the smaller the threshold TH3. For example, the threshold TH3 is calculated in the same way as the threshold TH2. With regard to the threshold TH4 according to the present embodiment, the higher the probability of the current topic, the larger the threshold TH4. For example, the threshold TH4 is calculated in the same way as the threshold TH1. Accordingly, when the current operation mode is the specific topic mode, the higher the probability of the current topic, the more easily the specific topic mode continues, and when there is another topic the probability of which is greater than or equal to the certain value, the lower the probability of the current topic, the more easily the topic is switched to the other topic.

Figure 5:
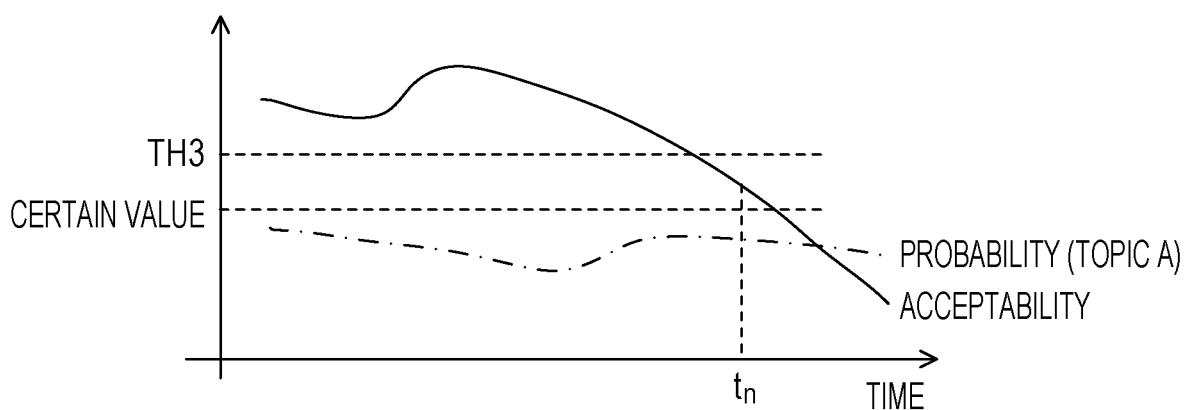
FIG. 5 is a graph illustrating an example of time-sequential changes in probability and acceptability.
Figure 6:
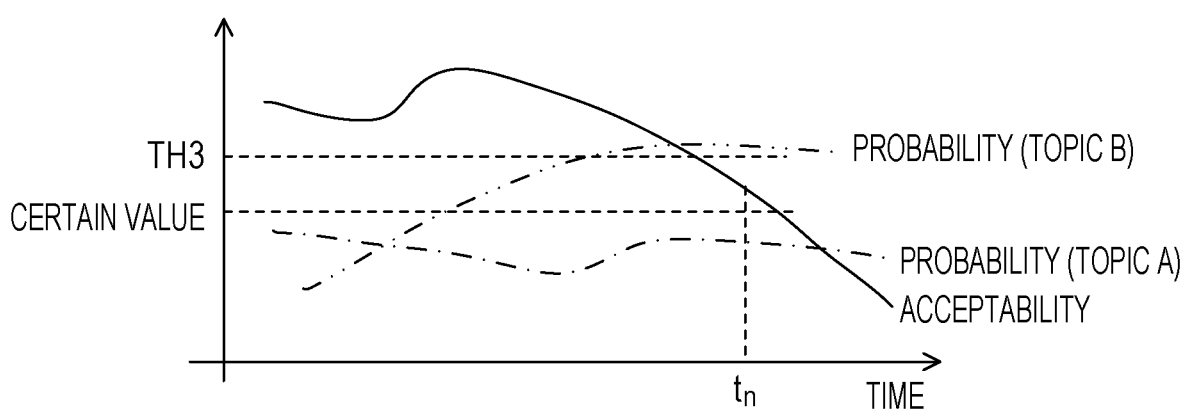
FIG. 6 is a graph illustrating an example of time-sequential changes in probability and acceptability.

With reference to FIG. 5 and FIG. 6, specific examples of a process in which an operation mode is selected by the selection unit 36 when the current operation mode is the specific topic mode will each be described. In FIG. 5 and FIG. 6, the solid line represents the acceptability and the dash-dot line represents the probability of topic A. The dash-dot-dot line in FIG. 6 represents the probability of topic B. With reference FIG. 5 and FIG. 6, the case where the current topic is topic A will be described.

As illustrated in FIG. 5, there is not a topic the probability of which is greater than or equal to the certain value at the time $t_n$. At the time $t_n$, the acceptability is less than the threshold TH3. Accordingly, the selection unit 36 selects listening mode as the operation mode. For example, in this case, the operation mode is switched from the specific topic mode to the listening mode.

As illustrated in FIG. 6, there is a topic (topic B in the example in FIG. 6) the probability of which is greater than or equal to the certain value other than the current topic (topic A in the example in FIG. 6) at the time $t_n$. At the time $t_n$, the acceptability is less than the threshold TH3. Accordingly, the selection unit 36 selects the specific topic mode as the operation mode and selects topic B the probability of which is greater than or equal to the certain value, as a topic for which an interaction proceeds in the specific topic mode. For example, in this case, the specific topic mode continues, and the topic for which an interaction proceeds in the specific topic mode is switched from topic A to topic B.

The generating unit 38 generates text data representing utterances according to the operation mode selected by the selection unit 36.

For example, when the operation mode selected by the selection unit 36 is the listening mode, the generating unit 38 generates text data representing utterances that prompt the user to freely make utterances to collect information of the user. Examples of the utterances generated by the generating unit 38 in the listening mode include a backchannel response and a question about utterances of the user. Examples of the utterances generated by the generating unit 38 in the listening mode include utterances such as "Did you go somewhere recently?" and "Did something good happen?".

When the operation mode selected by the selection unit 36 is the specific topic mode, the generating unit 38 generates text data representing utterances in which the interaction proceeds under the initiative of the system for a topic selected by the selection unit 36. Examples of utterances generated by the generating unit 38 in the specific topic mode include utterances according to a scenario built in advance onto the selected topic and utterances that provide detailed information on the selected topic. Examples of the scenario built in advance include the procedure for cooking food in the case where the topic is cooking. Examples of the scenario built in advance include the procedure from determining the destination to booking transportation and accommodations in the case where the topic is a travel.

The output unit 40 transmits to the interaction device 12 text data representing utterances generated by the generating unit 38, thereby causing the utterances generated by the generating unit 38 to be output from the voice output device 67 of the interaction device 12.

Figure 7:
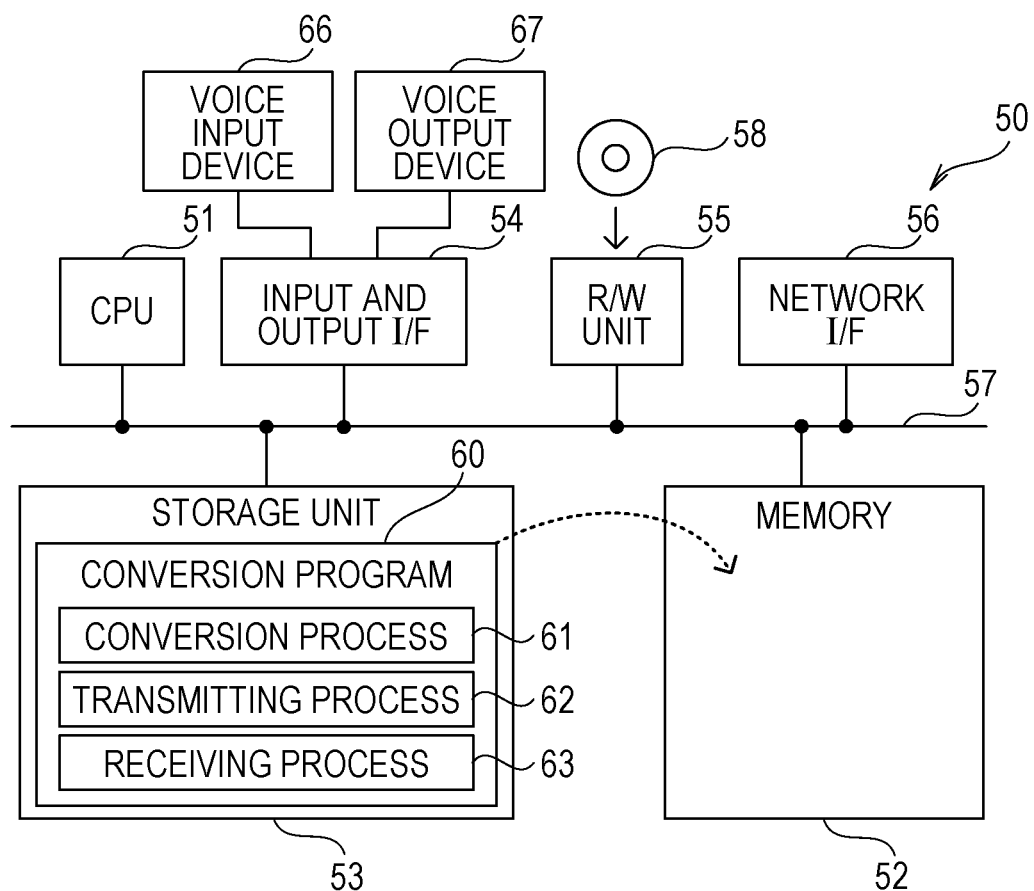
FIG. 7 is a block diagram illustrating a schematic configuration of a computer that functions as an interaction device according to each embodiment.

The interaction device 12 may be implemented, for example, by a computer 50 illustrated in FIG. 7. The computer 50 includes a central processing unit (CPU) 51, a memory 52 serving as a temporary storage area, and a nonvolatile storage unit 53. The computer 50 includes an input and output interface (I/F) 54 to which a voice input device 66, such as a microphone, and a voice output device 67, such as a speaker, are coupled. The computer 50 includes a read/write (R/W) unit 55 that controls reading and writing of data from and to a storage medium 58 and a network I/F 56 coupled to the network N. The CPU 51, the memory 52, the storage unit 53, the input and output I/F 54, the R/W unit 55, and the network I/F 56 are coupled via a bus 57.

The storage unit 53 may be implemented by a hard disk drive (HDD), a solid state drive (SSD), a flash memory, or the like. The storage unit 53 as a storage medium stores a conversion program 60 that causes the computer 50 to function as the interaction device 12. The conversion program 60 includes a conversion process 61, a transmitting process 62, and a receiving process 63.

The CPU 51 reads the conversion program 60 from the storage unit 53 and loads the conversion program 60 into the memory 52 to execute the processes included in the conversion program 60. The CPU 51 operates as the conversion unit 20 illustrated in FIG. 2 by executing the conversion process 61. The CPU 51 operates as the transmitting unit 22 illustrated in FIG. 2 by executing the transmitting process 62. The CPU 51 operates as the receiving unit 24 illustrated in FIG. 2 by executing the receiving process 63. Thus, the computer 50 executing the conversion program 60 functions as the interaction device 12. The CPU 51 that executes the processes included in the conversion program 60 is hardware.

The functions achieved by the conversion program 60 may be implemented by, for example, a semiconductor integrated circuit, more specifically, an application-specific integrated circuit (ASIC) or the like.

Figure 8:
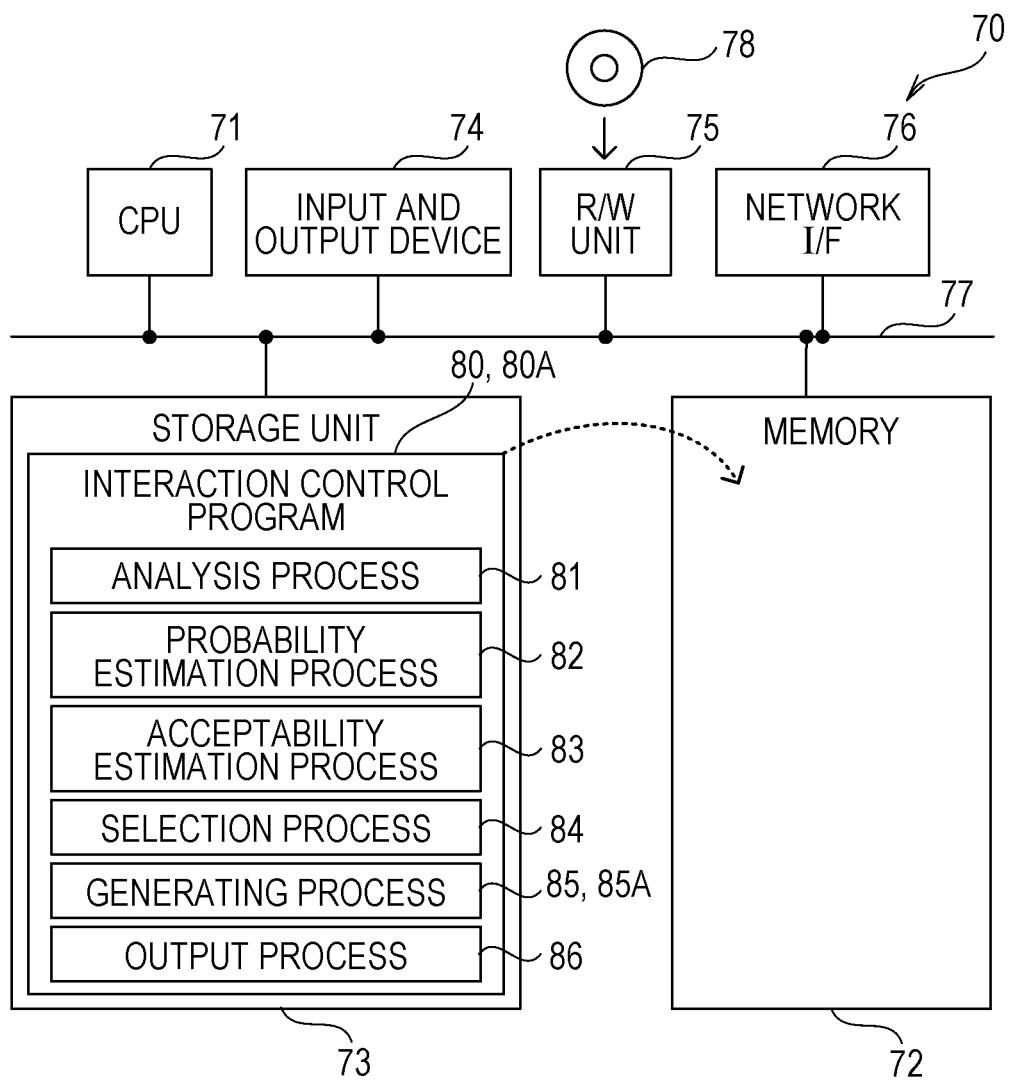
FIG. 8 is a block diagram illustrating a schematic configuration of a computer that functions as an interaction control device according to each embodiment.

The interaction control device 14 may be implemented, for example, by a computer 70 illustrated in FIG. 8. The computer 70 includes a CPU 71, memory 72 as a temporary storage area, and a nonvolatile storage unit 73. The computer 70 includes an input and output device 74 that includes a display device, an input device, and the like. The computer 70 includes a R/W unit 75 that controls reading and writing of data from and to a storage medium 78 and a network I/F 76 coupled to the network N. The CPU 71, the memory 72, the storage unit 73, the input and output device 74, the R/W unit 75, and the network I/F 76 are coupled via a bus 77.

The storage unit 73 may be implemented by an HDD, an SSD, a flash memory, or the like. The storage unit 73 as a storage medium stores an interaction control program 80 that causes the computer 70 to function as the interaction control device 14. The interaction control program 80 includes an analysis process 81, a probability estimation process 82, an acceptability estimation process 83, a selection process 84, a generating process 85, and an output process 86.

The CPU 71 reads the interaction control program 80 from the storage unit 73 and loads the interaction control program 80 into the memory 72 to execute the processes included in the interaction control program 80. The CPU 71 operates as the analysis unit 30 illustrated in FIG. 3 by executing the analysis process 81. The CPU 71 operates as the probability estimation unit 32 illustrated in FIG. 3 by executing the probability estimation process 82. The CPU 71 operates as the acceptability estimation unit 34 illustrated in FIG. 3 by executing the acceptability estimation process 83. The CPU 71 operates as the selection unit 36 illustrated in FIG. 3 by executing the selection process 84. The CPU 71 operates as the generating unit 38 illustrated in FIG. 3 by executing the generating process 85. The CPU 71 operates as the output unit 40 illustrated in FIG. 3 by executing the output process 86. Thus, the computer 70 executing the interaction control program 80 functions as the interaction control device 14. The CPU 71 that executes the processes included in the interaction control program 80 is hardware.

The functions achieved by the interaction control program 80 may also be implemented by, for example, a semiconductor integrated circuit, more specifically an ASIC or the like.

Operations of the interaction control system 10 according to the present embodiment will now be described. The interaction device 12 executes the conversion program 60, executing the converting process illustrated in FIG. 9. The converting process illustrated in FIG. 9 is performed, for example, when the interaction device 12 is powered on or when a start word determined in advance is input to the interaction device 12 via the voice input device 66.

Figure 10:
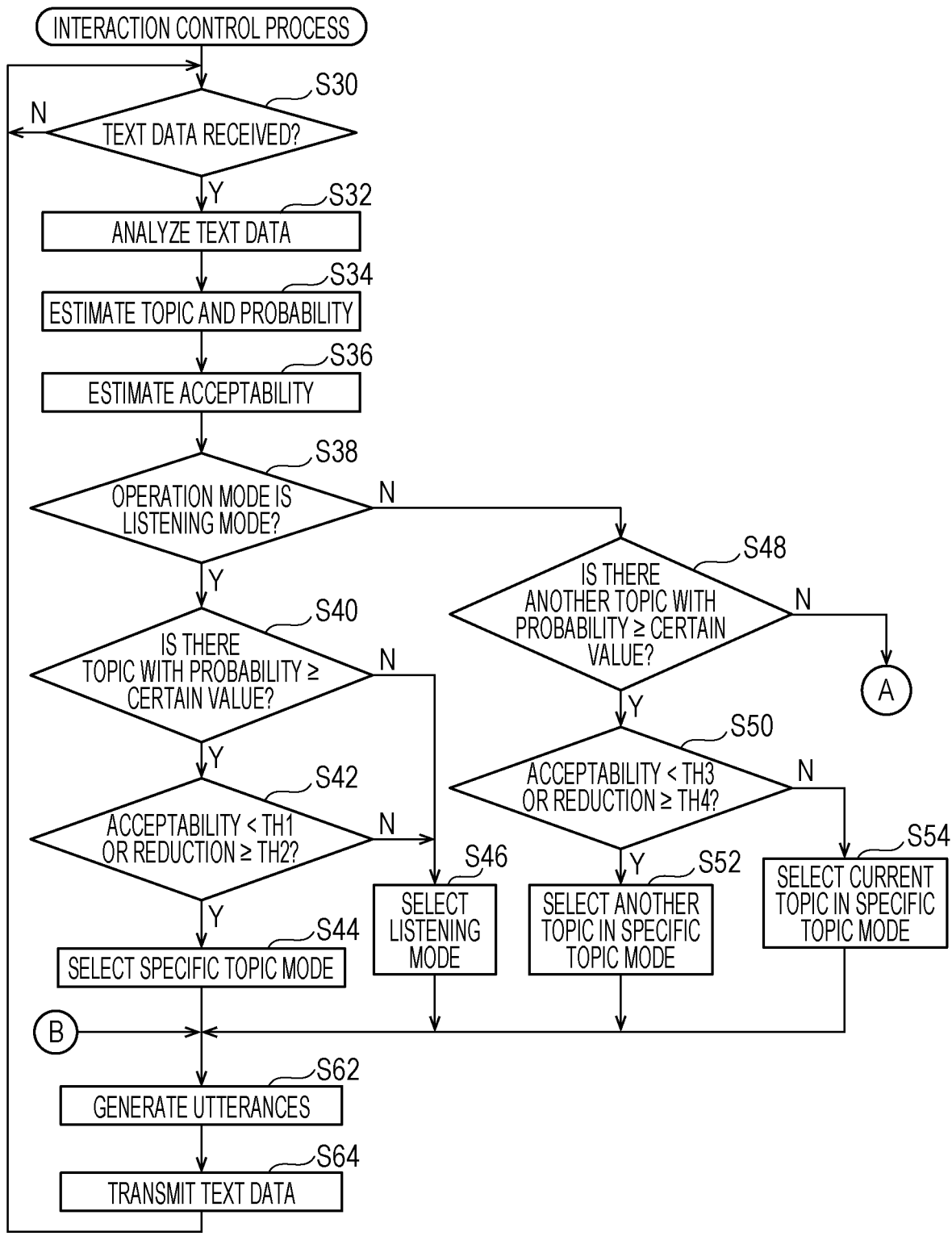
FIG. 10 is a flowchart illustrating an example of an interaction control process according to a first embodiment.
Figure 11:
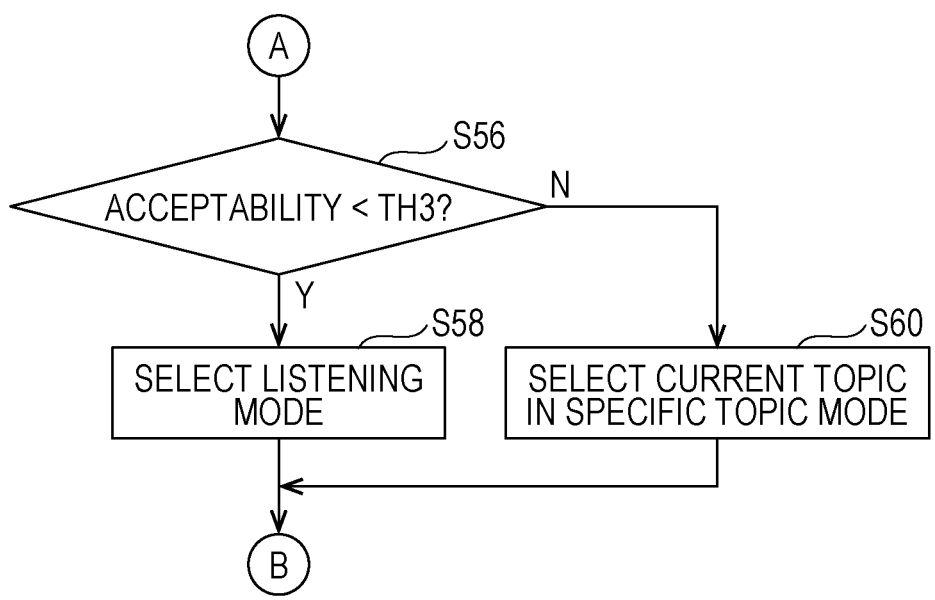
FIG. 11 is a flowchart illustrating an example of an interaction control process according to each embodiment.

The interaction control device 14 performs the interaction control process illustrated in FIG. 10 and FIG. 11 by executing the interaction control program 80. The interaction control process illustrated in FIG. 10 and FIG. 11 is performed, for example, when the interaction control device 14 is powered on or when a start word determined in advance is input to the interaction device 12 via the voice input device 66 and the start word is received via a network. In the present embodiment, the case where the initial operation mode is the listening mode is described.

Figure 9:
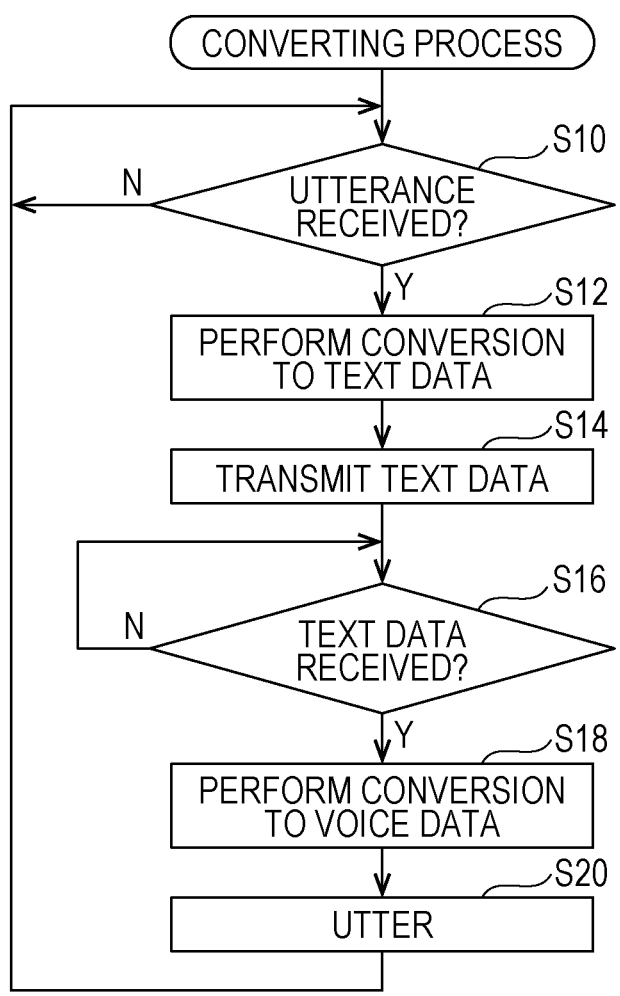
FIG. 9 is a flowchart illustrating an example of a converting process according to each embodiment.

In step S10 in FIG. 9, the conversion unit 20 waits until receipt of utterances of the user via the voice input device 66. When the utterances of the user are input via the voice input device 66, the determination in step S10 is affirmative and the process proceeds to step S12. In step S12, the conversion unit 20 converts, to text data, voice data representing the utterances received in step S10.

In step S14, the transmitting unit 22 transmits text data representing utterances of the user obtained by conversion in step S12 to the interaction control device 14. In step S16, the receiving unit 24 waits until receipt of text data transmitted from the interaction control device 14. When the receiving unit 24 receives text data transmitted in response to the text data transmitted in step S14 from the interaction control device 14 in step S64 in FIG. 10 described later, the determination in step S16 is affirmative. When the determination in step S16 is affirmative, the process proceeds to step S18.

In step S18, the conversion unit 20 converts the text data received in step S16 to voice data. In step S20, the conversion unit 20 utters a response by causing the voice data obtained by conversion in step S18 to be output from the voice output device 67. Upon completion of step S20, the process returns to step S10.

The converting process illustrated in FIG. 9 terminates, for example, when the interaction device 12 is powered off or when an end word determined in advance is input to the interaction device 12 via the voice input device 66.

In step S30 in FIG. 10, the analysis unit 30 waits until receipt of text data representing utterances of the user transmitted from the interaction device 12. When the analysis unit 30 receives text data transmitted from the interaction device 12 in step S14 in FIG. 9, the determination in step S30 is affirmative and the process proceeds to step S32.

In step S32, the analysis unit 30 performs known natural language processing on the text data received in step S30, thereby performing morphological analysis, determining the meaning of a sentence, such as a question sentence, or a sentence in an affirmative form, a negative form, or another form, and performing analysis such as estimation of emotion. In step S34, as described above, the probability estimation unit 32 estimates a topic in which the user is interested, by using the text data received in step S30, and estimates the probability of the estimated topic in accordance with the determination items (A) to (D) mentioned above.

In step S36, as described above, the acceptability estimation unit 34 estimates the acceptability by using the text data received in step S30 in accordance with the determination items (E) to (K) mentioned above. The acceptability estimation unit 34 also calculates the reduction in acceptability according to equation (5). In equation (5), $t_{n-1}$ corresponds to a time at which step S36 was performed previously, and $t_n$ corresponds to the current time. In equation (5), $J_{n-1}$ corresponds to the acceptability estimated in step S36 performed previously, and $J_n$ corresponds to the acceptability estimated in step S38 performed currently.

In step S38, the selection unit 36 determines whether the current operation mode is the listening mode. If the determination is negative, that is, the current operation mode is the specific topic mode, the process proceeds to step S48; however, if the determination is affirmative, the process proceeds to step S40.

In step S40, the selection unit 36 determines whether there is a topic the probability of which is estimated in step S34 to be greater than or equal to the certain value. If the determination is negative, the process proceeds to step S46; however, if the determination is affirmative, the process proceeds to step S42. In step S42, the selection unit 36 determines whether the acceptability estimated in step S36 is less than the threshold TH1 or whether the reduction in acceptability calculated in step S36 is greater than or equal to the threshold TH2. If the determination is negative, the process proceeds to step S46; however, if the determination is affirmative, the process proceeds to step S44. During this determination, the selection unit 36 calculates the threshold TH1 by using the probability estimated in step S34 according to equation (1). During this determination, the selection unit 36 calculates the threshold TH2 by using the probability estimated in step S34 according to equation (3).

In step S44, as described above, the selection unit 36 selects the specific topic mode as the operation mode and selects, as a topic for which an interaction proceeds in the specific topic mode, a topic the probability of which is estimated in step S34 to be greater than or equal to the certain value. Upon completion of step S44, the process proceeds to step S62. In step S46, the selection unit 36 selects the listening mode as the operation mode. Upon completion of step S46, the process proceeds to step S62.

In step S48, as described above, the selection unit 36 determines whether there is another topic the probability of which is estimated in step S34 to be greater than or equal to the certain value. If this determination is affirmative, the process proceeds to step S50. In step S50, the selection unit 36 determines whether the acceptability estimated in step S36 is less than the threshold TH3 or whether the reduction in acceptability calculated in step S36 is greater than or equal to the threshold TH4. If the determination is negative, the process proceeds to step S54; however, if the determination is affirmative, the process proceeds to step S52. During this determination, as described above, the selection unit 36 calculates the threshold TH3 in the same way as the selection unit 36 calculates the threshold TH2 and calculates the threshold TH4 in the same way as the selection unit 36 calculates the threshold TH1.

In step S52, the selection unit 36 selects the specific topic mode as the operation mode and selects, as a topic for which an interaction proceeds in the specific topic mode, another topic the probability of which is estimated in step S34 to be greater than or equal to the certain value. Upon completion of step S52, the process proceeds to step S62.

In step S54, the selection unit 36 selects the specific topic mode as the operation mode and selects the current topic as a topic for which an interaction proceeds in the specific topic mode. Upon completion of step S54, the process proceeds to step S62.

If the determination in step S48 is negative, the process proceeds to step S56 in FIG. 11. In step S56 in FIG. 11, the selection unit 36 determines whether the acceptability estimated in step S36 is less than the threshold TH3. If the determination is negative, the process proceeds to step S60; however, if the determination is affirmative, the process proceeds to step S58. During this determination, as described above, the selection unit 36 calculates the threshold TH3 in the same way as the selection unit 36 calculates the threshold TH2.

In step S58, the selection unit 36 selects the listening mode as the operation mode. Upon completion of step S58, the process proceeds to step S62 in FIG. 10. In step S60, the selection unit 36 selects the specific topic mode as the operation mode and selects the current topic as a topic for which an interaction proceeds in the specific topic mode. Upon completion of step S60, the process proceeds to step S62 in FIG. 10.

In step S62 in FIG. 10, as described above, the generating unit 38 generates text data representing utterances according to the operation mode selected through the process described above. For example, when step S62 is performed after step S44, step S52, step S54, or step S60, the generating unit 38 generates text data describing that an interaction proceeds under the initiative of the system for a topic selected in step S44, step S52, step S54, or step S60. In contrast, when step S62 is performed after step S46 or step S58, the generating unit 38 generates text data of prompting the user to freely make utterances.

In step S64, the output unit 40 transmits the text data generated in step S62 to the interaction device 12, thereby causing the utterances generated by the generating unit 38 to be output from the voice output device 67 of the interaction device 12. Upon completion of step S64, the process returns to step S30.

The interaction control process illustrated in FIG. 10 and FIG. 11 terminates, for example, when the interaction control device 14 is powered off or when an end word determined in advance is input to the interaction device 12 via the voice input device 66.

As described above, according to the present embodiment, in accordance with the probability that a user is interested in a topic that interests the user and the acceptability of an interaction by the user, which of the listening mode and the specific topic mode is selected as the operation mode in which the interaction is performed. Utterances according to the selected operation mode are output from the voice output device 67. Accordingly, it may be suppressed that the user side or the system side unilaterally utters words to make an interaction monotonic. As a result, a continuous interaction may be performed without boring the user.

According to the present embodiment, the thresholds TH1, TH2, TH3, and TH4 differ in accordance with the probability. Accordingly, a suitable operation mode in accordance with the probability is selected and, as a result, the user may further perform a continuous interaction with a user without boring the user.

Second Embodiment

A second embodiment of the disclosed techniques will be described. The configuration of the interaction control system 10, the functional configuration of the interaction device 12, and the configuration of a computer that functions as the interaction device 12 according to the present embodiment are the same as those in the first embodiment, and therefore description thereof is omitted.

With reference to FIG. 3, the functional configuration of an interaction control device 14A according to the present embodiment will be described. The functional units having the same functions as the functional units of the interaction control device 14 according to the first embodiment are denoted by the same reference numerals and description thereof is omitted. As illustrated in FIG. 3, the interaction control device 14A includes the analysis unit 30, the probability estimation unit 32, the acceptability estimation unit 34, the selection unit 36, a generating unit 38A, and the output unit 40.

The generating unit 38A has, in addition to the functions of the generating unit 38 according to the first embodiment, the following functions. When the current operation mode differs from the operation mode selected by the selection unit 36, the generating unit 38A generates text data representing utterances including notifying the user of switching of the operation mode. For example, when the operation mode is switched from the listening mode to the specific topic mode, the generating unit 38A generates text data that represents utterances including notifying the user that the system itself takes initiative in the interaction. Examples of the utterances including notifying the user that the system itself takes initiative in the interaction include "Please listen to me." and "Apart from that, I want to talk about A." In this example, "A" represents a topic for which an interaction proceeds in the specific topic mode selected by the selection unit 36.

When the operation mode is switched from the specific topic mode to the listening mode, the generating unit 38A generates text data that represents utterances including notifying the user of transfer of the interaction initiative to the user. Examples of the utterances including notifying the user of transfer of the interaction initiative to the user include "What do you think?", "Speaking of A, is there anything else?", and "Do you have anything that you want to talk about?" In this example, "A" represents a topic for which an interaction has proceeded in the specific topic mode.

When the specific topic mode continues as the operation mode and the topic is switched, the generating unit 38A generates text data that represents utterances including notifying the user that the topic for which the interaction proceeds will be changed to a new topic. Examples of the utterances including notifying the user that the topic for which the interaction proceeds will be changed to a new topic include "By the way, I want to talk about A" and "By the way, do you know anything about A?". In this example, "A" represents a topic for which an interaction proceeds in the specific topic mode.

The interaction control device 14A may be implemented, for example, by the computer 70 illustrated in FIG. 8. The same or similar elements as those in the first embodiment illustrated in FIG. 8 are denoted by the same or similar reference numerals, and repetitive descriptions are omitted. The storage unit 73 of the computer 70 stores an interaction control program 80A that causes the computer 70 to function as the interaction control device 14A. The interaction control program 80A includes the analysis process 81, the probability estimation process 82, the acceptability estimation process 83, the selection process 84, a generating process 85A, and the output process 86.

The CPU 71 reads the interaction control program 80A from the storage unit 73 and loads the interaction control program 80A into the memory 72 to execute the processes included in the interaction control program 80A. The CPU 71 operates as the analysis unit 30 illustrated in FIG. 3 by executing the analysis process 81. The CPU 71 operates as the probability estimation unit 32 illustrated in FIG. 3 by executing the probability estimation process 82. The CPU 71 operates as the acceptability estimation unit 34 illustrated in FIG. 3 by executing the acceptability estimation process 83. The CPU 71 operates as the selection unit 36 illustrated in FIG. 3 by executing the selection process 84. The CPU 71 operates as the generating unit 38A illustrated in FIG. 3 by executing the generating process 85A. The CPU 71 operates as the output unit 40 illustrated in FIG. 3 by executing the output process 86. Thus, the computer 70 executing the interaction control program 80A functions as the interaction control device 14A. The CPU 71 that executes the processes included in the interaction control program 80A is hardware.

The functions achieved by the interaction control program 80A may also be implemented by, for example, a semiconductor integrated circuit, more specifically an ASIC or the like.

Operations of the interaction control system 10 according to the present embodiment will now be described. The converting process performed by the interaction device 12 according to the present embodiment is the same as in the first embodiment, and therefore description thereof is omitted.

Figure 12:
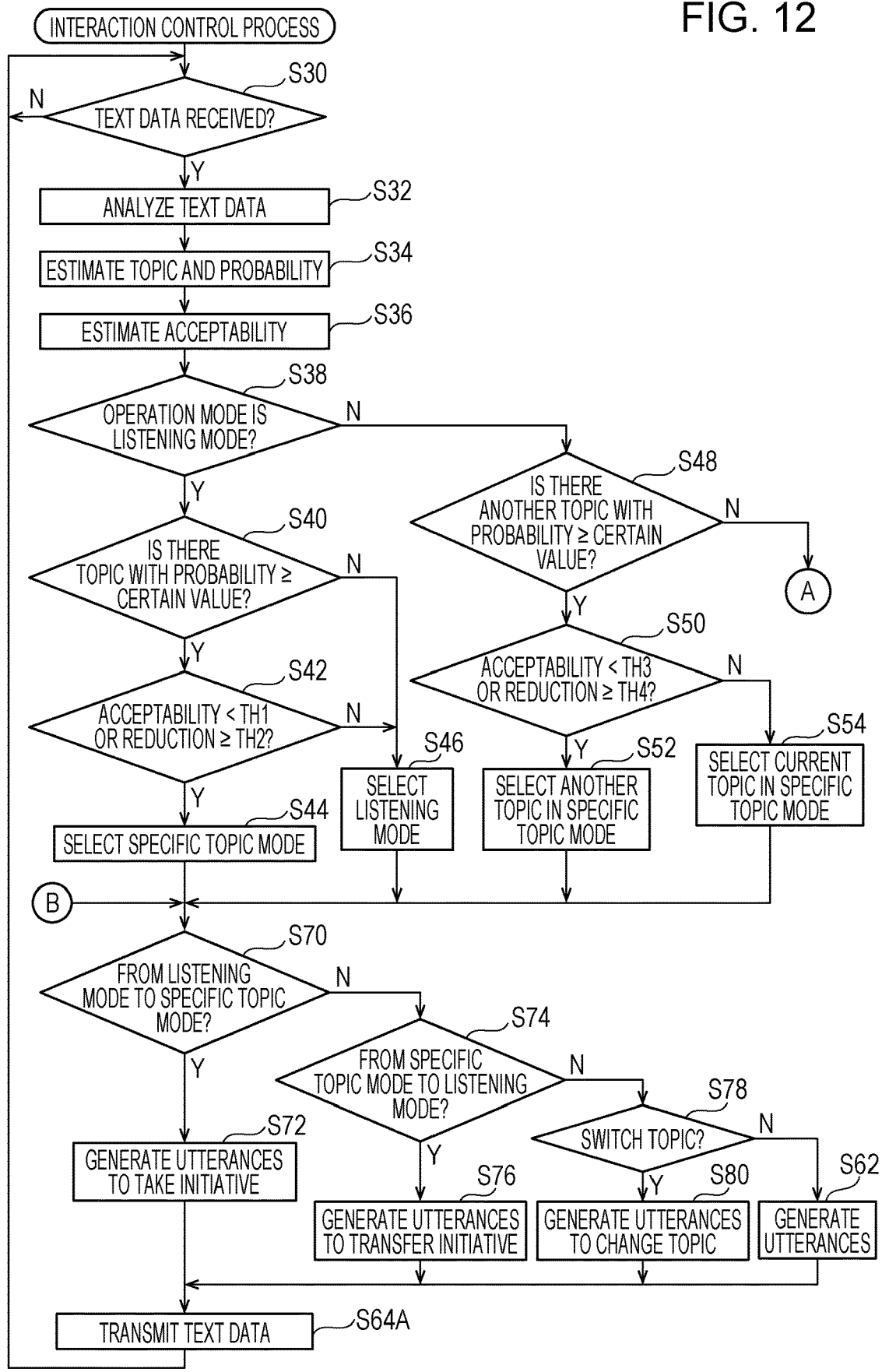
FIG. 12 is a flowchart illustrating an example of an interaction control process according to a second embodiment.

The interaction control device 14A performs the interaction control process illustrated in FIG. 12 and FIG. 11 by executing the interaction control program 80A. Of the interaction control process performed by the interaction control device 14A according to the present embodiment, the part illustrated in FIG. 11 is the same as in the first embodiment, and therefore description thereof is omitted. The steps in FIG. 12 that are the same as illustrated in FIG. 10 are denoted by the same reference numerals, and description thereof is omitted. The interaction control process illustrated in FIG. 11 and FIG. 12 is performed, for example, when the interaction control device 14A is powered on or when a start word determined in advance is input to the interaction device 12 via the voice input device 66. In the present embodiment, the case where the initial operation mode is the listening mode is described.

Upon completion of step S44, step S46, step S52, or step S54 in FIG. 12, or step S58 or step S60 in FIG. 11, the process proceeds to step S70 in FIG. 12.

In step S70, the generating unit 38A determines whether the operation mode may be switched from the listening mode to the specific topic mode. If the determination is negative, the process proceeds to step S74; however, if the determination is affirmative, the process proceeds to step S72. When step S70 is performed after step S44, the determination in step S70 is affirmative. When step S70 is performed after step S46, step S52, step S54, step S58 or step S60, the determination in step S70 is negative.

In step S72, as described above, the generating unit 38A generates text data that represents utterances including notifying the user that the system itself takes initiative in the interaction. Upon completion of step S72, the process proceeds to step S64A.

In step S74, the generating unit 38A determines whether the operation mode may be switched from the specific topic mode to the listening mode. If the determination is negative, the process proceeds to step S78; however, if the determination is affirmative, the process proceeds to step S76. When step S74 is performed after step S58, the determination in step S74 is affirmative, and when step S74 is performed after step S46, step S52, step S54, or step S60, the determination in step S74 is negative.

In step S76, the generating unit 38A generates text data that represents utterances including notifying the user of transfer of the interaction initiative to the user. Upon completion of step S76, the process proceeds to step S64A.

In step S78, the generating unit 38A determines whether the specific topic mode continues as the operation mode and the topic may be switched. If the determination is negative, the process proceeds to step S62; however, if the determination is affirmative, the process proceeds to step S80. When step S78 is performed after step S52, the determination in step S78 is affirmative, and when step S78 is performed after step S46, step S54, or step S60, the determination in step S78 is negative.

In step S80, the generating unit 38A generates text data that represents utterances including notifying the user that the topic for which the interaction proceeds will be changed to a new topic. Upon completion of step S80, the process proceeds to step S64A. Upon completion of step S62, the process proceeds to step S64A.

In step S64A, the output unit 40 transmits to the interaction device 12 the text data that represents utterances generated in step S62, step S72, step S76, or step S80. Thus, the output unit 40 causes the utterances generated by the generating unit 38A to be output from the voice output device 67 of the interaction device 12. Upon completion of step S64A, the process returns to step S30.

The interaction control process illustrated in FIG. 11 and FIG. 12 terminates, for example, when the interaction control device 14A is powered off or when an end word determined in advance is input to the interaction device 12 via the voice input device 66.

In the second embodiment, when the operation mode is switched form the listening mode to the specific topic mode, the generating unit 38A may generate text data that represents utterances including notifying the user that the topic for which the interaction proceeds will be changed to a new topic.

In the second embodiment, when the operation mode is switched from the listening mode to the specific topic mode even though the acceptability is greater than or equal to a threshold TH5, the generating unit 38A generates utterances including notifying the user that the system itself takes initiative in the interaction. In this case, when the acceptability is less than or equal to the threshold TH5 and the operation mode is switched form the listening mode to the specific topic mode, the generating unit 38A generates text data that represents utterances including notifying the user that the topic for which the interaction proceeds will be changed to a new topic. The form is illustrated in which, as the threshold TH5 in this case, for example, a value determined in advance is applied as the lower limit value (for example, 0.7) of a value indicating that the user is satisfied with an interaction with the interaction control system 10.

As described above, according to the present embodiment, effects similar to those in the first embodiment may be obtained. According to the present embodiment, when the current operation mode differs from the selected operation mode, utterances including notifying the user of switching of the operation mode are generated. Accordingly, the user easily keeps track of which of the user and the system seizes initiative in an interaction. This may result in a smooth interaction with the user.

In the aforementioned embodiments, the examples in which the disclosed techniques are applied to an interaction control system that makes a voice interaction with the user have been described. However, the disclosed techniques are not limited to this. For example, the form in which the disclosed techniques are applied to an interaction control system that makes an interaction with the user by using text, such as a text chat, may be employed. In this case, text input by the user corresponds to input from the user in the disclosed techniques, and text output to a display device or the like of the interaction device 12 corresponds to an interaction output in the disclosed techniques. The combination of an input from the user and an interaction output may be any of a combination of voice and voice, a combination of voice and text, a combination of text and voice, and a combination of text and text.

In the aforementioned embodiments, the examples in which the interaction control system 10 is implemented by the interaction device 12 and the interaction control device 14 or 14A have been described. However, the interaction control system 10 is not limited to this. The form in which the interaction control system 10 is implemented by the interaction device 12 may be employed. In this case, the form in which the interaction device 12 includes the functions included in the interaction control device 14 or 14A is illustrated.

In the aforementioned embodiments, when the current operation mode is the listening mode, the operation mode may be selected by using the acceptability or the reduction in acceptability instead of the probability. In this case, the process in step S40 in FIG. 10 is unnecessary.

In the aforementioned embodiments, the cases where the thresholds TH1, TH2, TH3, and TH4 differ in accordance with the probability have been described. However, these thresholds are not limited to this. At least one of the thresholds TH1, TH2, TH3, and TH4 may be a fixed value determined in advance.

In the aforementioned present embodiments, the case where the initial operation mode is the listening mode has been described. However, the initial operation mode is not limited to this. The initial operation mode may be the specific topic mode. In this case, the form is illustrated in which a general topic such as weather, a popular topic, a topic covered in the news, or the like is applied as the initial topic.

In the aforementioned embodiments, the acceptability may have a value such that the higher the degree to which the user accepts an interaction with the interaction control system 10, the smaller the value. In this case, the form is illustrated in which the magnitude relationship among values related to the acceptability is opposite to that in the aforementioned embodiments. In the aforementioned embodiments, the higher the likelihood that the user is interested in a topic, the smaller the probability may be. In this case, the form is illustrated in which the magnitude relationship among values related to the probability is opposite to that in the aforementioned embodiments.

In the aforementioned embodiments, the manner in which the conversion program 60 is stored (installed) in advance in the storage unit 53 has been described. However, the conversion program 60 is not limited to this. The conversion program 60 may be provided in a form of a storage medium, such as a compact disc read-only memory (CD-ROM), a digital versatile disc (DVD)-ROM, a Universal Serial Bus (USB) memory, or a memory card, in which the conversion program 60 is stored.

In the aforementioned embodiments, the manner in which the interaction control program 80 or 80A is stored (installed) in advance in the storage unit 73 has been described. However, the manner of storage of the interaction control program 80 or 80A is not limited to this. The interaction control program 80 or 80A may be provided in a form of a storage medium, such as a CD-ROM, a DVD-ROM, a USB memory, or a memory card, in which the interaction control program 80 or 80A is stored.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   estimating, based on an input from a user to an interaction performed during a conversation between the user and the computer, an interest degree indicating a degree of interest of the user in a first topic included in the interaction;
   estimating, based on the input from the user to the interaction, acceptability of the interaction by the user;
   automatically selecting, in accordance with the interest degree and the acceptability, as an operation mode for performing the interaction, one of a first mode of leaving an interaction initiative to the user and a second mode in which the interaction proceeds under an initiative of a system for a specific topic;
   generating interaction data according to the selected operation mode; and
   causing an output device to output the generated interaction data.

2. The non-transitory, computer-readable recording medium of claim 1, wherein:
   the acceptability takes a value that becomes greater as a degree to which the user accepts the interaction becomes higher;
   the interest degree takes a value that becomes greater as a likelihood that the user is interested in the first topic becomes higher; and
   the selecting includes selecting the second mode as the operation mode when the operation mode at present is the first mode, and when the acceptability is less than a first threshold, the first threshold being increased as the interest degree becomes higher, or a reduction in the acceptability is greater than a second threshold, the second threshold being decreased as the interest degree becomes higher.

3. The non-transitory, computer-readable recording medium of claim 2, wherein the selecting includes selecting the second mode as the operation mode when there is a second topic for which the interest degree is higher than or equal to a certain value.

4. The non-transitory, computer-readable recording medium of claim 1, wherein:
   the acceptability takes a value that becomes greater as a degree to which the user accepts the interaction becomes higher; and
   the selecting includes selecting the first mode as the operation mode when the operation mode at present is the second mode, and when the acceptability is less than a threshold, the threshold being decreased as the interest degree becomes higher.

5. The non-transitory, computer-readable recording medium of claim 1, wherein:
   the acceptability takes a value that becomes greater as a degree to which the user accepts the interaction becomes higher;
   the interest degree takes a value that becomes greater as a likelihood that the user is interested in the first topic becomes higher; and the process comprises, when the operation mode at present is the second mode, when the acceptability is less than a first threshold, the first threshold being increased as the interest degree becomes higher, or a reduction in the acceptability is greater than or equal to a second threshold, the second threshold being decreased as the interest degree becomes higher, and when there is a second topic for which the interest degree is greater than or equal to a certain value, continuing a current mode of the operation mode and generating the interaction data regarding the second topic.

6. The non-transitory, computer-readable recording medium of claim 5, wherein:
the first threshold is a value that becomes smaller as the interest degree for a current topic becomes higher; and
the second threshold is a value that becomes larger as the interest degree for the current topic becomes higher.

7. The non-transitory, computer-readable recording medium of claim 1, wherein the interest degree decreases with lapse of time.

8. The non-transitory, computer-readable recording medium of claim 1, the process comprising when the operation mode at present differs from the selected operation mode, generating an interaction output including notifying the user of switching of the operation mode.

9. The non-transitory, computer-readable recording medium of claim 8, wherein:
the acceptability is a value that becomes greater as the first degree of interest becomes higher; and
the process comprises generating an interaction output including notifying the user that a system side takes initiative in an interaction when the operation mode at present is the first mode, and when the selected operation mode is the second mode.

10. An apparatus comprising:
a memory; and
a processor coupled to the memory and configured to:
estimate, based on an input from a user to an interaction performed during a conversation between the user and the computer, an interest degree indicating a degree of interest of the user in a first topic included in the interaction;
estimate, based on the input from the user to the interaction, acceptability of the interaction by the user;
automatically select, in accordance with the interest degree and the acceptability, as an operation mode for performing the interaction, one of a first mode of leaving an interaction initiative to the user and a second mode in which the interaction proceeds under an initiative of a system for a specific topic;
generate interaction data according to the selected operation mode; and
cause an output device to output the generated interaction data.

11. The apparatus of claim 10, wherein:
the acceptability takes a value that becomes greater as a degree to which the user accepts the interaction becomes higher;
the interest degree takes a value that becomes greater as a likelihood that the user is interested in the first topic becomes higher; and
the processor is configured to select the second mode as the operation mode when the operation mode at present is the first mode, and when the acceptability is less than a first threshold, the first threshold being increased as the interest degree becomes higher, or a reduction in the acceptability is greater than a second threshold, the second threshold being decreased as the interest degree becomes higher.

12. The apparatus of claim 11, wherein the processor is configured to select the second mode as the operation mode when there is a second topic for which the interest degree is higher than or equal to a certain value.

13. The apparatus of claim 10, wherein:
the acceptability takes a value that becomes greater as a degree to which the user accepts the interaction becomes higher; and
the processor is configured to select the first mode as the operation mode when the operation mode at present is the second mode, and when the acceptability is less than a threshold, the threshold being decreased as the interest degree becomes higher.

14. The apparatus of claim 10, wherein:
the acceptability takes a value that becomes greater as a degree to which the user accepts the interaction becomes higher;
the interest degree takes a value that becomes greater as a likelihood that the user is interested in the first topic becomes higher; and
the processor is configured to, when the operation mode at present is the second mode, when the acceptability is less than a first threshold, the first threshold being increased value becomes greater as the interest degree becomes higher, or a reduction in the acceptability is greater than or equal to a second threshold, the second threshold being decreased as the interest degree becomes higher, and when there is a second topic for which the interest degree is greater than or equal to a certain value, continue a current mode of the operation mode and generate the interaction data regarding the second topic.

15. The apparatus of claim 14, wherein:
the first threshold is a value that becomes smaller as the interest degree for a current topic becomes higher; and
the second threshold is a value that becomes larger as the interest degree for the current topic becomes higher.

16. The apparatus of claim 10, wherein the interest degree decreases with lapse of time.

17. A method performed by a computer, the method comprising:
estimating, based on an input from a user to an interaction performed during a conversation between the user and the computer, an interest degree indicating a degree of interest of the user in a first topic included in the interaction;
estimating, based on the input from the user to the interaction, acceptability of the interaction by the user;
automatically selecting, in accordance with the interest degree and the acceptability, as an operation mode for performing the interaction, one of a first mode of leaving an interaction initiative to the user and a second mode in which the interaction proceeds under an initiative of a system for a specific topic;
generating interaction data according to the selected operation mode; and
causing an output device to output the generated interaction data.

* * * * *